(12) United States Patent
Huang

(10) Patent No.: US 10,133,738 B2
(45) Date of Patent: Nov. 20, 2018

(54) TRANSLATION CONFIDENCE SCORES

(71) Applicant: Facebook, Inc., Menlo Park, CA (US)

(72) Inventor: Fei Huang, Boonton, NJ (US)

(73) Assignee: FACEBOOK, INC., Menlo Park, CA (US)

( * ) Notice: Subject to any disclaimer, the term of this patent is extended or adjusted under 35 U.S.C. 154(b) by 175 days.

(21) Appl. No.: 14/967,897

(22) Filed: Dec. 14, 2015

(65) Prior Publication Data

US 2017/0169015 A1  Jun. 15, 2017

(51) Int. Cl.
*G06F 17/28* (2006.01)
*G06F 17/27* (2006.01)

(52) U.S. Cl.
CPC ........ *G06F 17/2854* (2013.01); *G06F 17/289* (2013.01); *G06F 17/2818* (2013.01); *G06F 17/2872* (2013.01); *G06F 17/2755* (2013.01)

(58) Field of Classification Search
CPC .. G06F 17/289; G06F 17/2872; G06F 9/4448; G06F 17/2785; G06F 17/274
See application file for complete search history.

(56) References Cited

U.S. PATENT DOCUMENTS

| | | | |
|---|---|---|---|
| 5,293,581 A | 3/1994 | DiMarco et al. |
| 5,477,451 A | 12/1995 | Brown et al. |
| 5,510,981 A | 4/1996 | Berger et al. |
| 5,799,193 A | 8/1998 | Sherman et al. |
| 5,991,710 A | 11/1999 | Papineni et al. |
| 6,002,998 A | 12/1999 | Martino et al. |
| 6,157,905 A | 12/2000 | Powell |
| 6,161,082 A | 12/2000 | Goldberg |
| 6,223,150 B1 | 4/2001 | Duan et al. |
| 6,266,642 B1 | 7/2001 | Franz et al. |
| 6,304,841 B1 | 10/2001 | Berger et al. |
| 6,377,925 B1 | 4/2002 | Newman et al. |
| 6,393,389 B1 | 5/2002 | Chanod et al. |
| 6,629,095 B1 | 9/2003 | Wagstaff et al. |
| 7,054,804 B2 | 5/2006 | Gonzales et al. |
| 7,110,938 B1 | 9/2006 | Cheng et al. |
| 7,359,861 B2 | 4/2008 | Lee et al. |
| 7,533,019 B1 | 5/2009 | Riccardi et al. |

(Continued)

OTHER PUBLICATIONS

Non-Final Office Action dated Dec. 17, 2015, for U.S. Appl. No. 14/302,032 of Saint Cyr, L., filed Jun. 11, 2014.

(Continued)

*Primary Examiner* — Vu B Hang

(57) ABSTRACT

A confidence scoring system can include a model trained using features extracted from translations that have received user translation ratings. The features can include, e.g. sentence length, an amount of out-of-vocabulary or rare words, language model probability scores of the source or translation, or a semantic similarity between the source and a translation. Parameters of the confidence model can then be adjusted based on a comparison of the confidence model output and user translation ratings, where the user translation ratings can be selected or weighted based on a determination of individual user fluentness. After the confidence model has been trained, it can produce confidence scores for new translations. If a confidence score is higher than a threshold, it can indicate the translation should be selected for automatic presentation to users. If the confidence score is below another threshold, it can indicate the translation should be updated.

20 Claims, 6 Drawing Sheets

(56) References Cited

U.S. PATENT DOCUMENTS

| | | |
|---|---|---|
| 7,664,629 B2 | 2/2010 | Dymetman et al. |
| 7,813,918 B2 | 10/2010 | Muslea et al. |
| 7,827,026 B2 | 11/2010 | Brun et al. |
| 7,895,030 B2 | 2/2011 | Al-Onaizan et al. |
| 7,983,903 B2 | 7/2011 | Gao et al. |
| 8,015,140 B2 | 9/2011 | Kumar et al. |
| 8,145,484 B2 | 3/2012 | Zweig et al. |
| 8,175,244 B1 | 5/2012 | Frankel et al. |
| 8,204,739 B2 | 6/2012 | Lane et al. |
| 8,209,333 B2 | 6/2012 | Hubbard et al. |
| 8,265,923 B2 | 9/2012 | Chatterjee et al. |
| 8,275,602 B2 | 9/2012 | Curry et al. |
| 8,386,235 B2 | 2/2013 | Duan et al. |
| 8,543,580 B2 | 9/2013 | Chen et al. |
| 8,756,050 B1 | 6/2014 | Curtis et al. |
| 8,825,466 B1 | 9/2014 | Wang et al. |
| 8,825,759 B1 | 9/2014 | Ho et al. |
| 8,831,928 B2 | 9/2014 | Marcu et al. |
| 8,838,434 B1 | 9/2014 | Liu |
| 8,874,429 B1 | 10/2014 | Crosley et al. |
| 8,897,423 B2 | 11/2014 | Nanjundaswamy |
| 8,935,150 B2 | 1/2015 | Christ |
| 8,942,973 B2 | 1/2015 | Viswanathan |
| 8,949,865 B1 | 2/2015 | Murugesan et al. |
| 8,983,974 B1 | 3/2015 | Ho et al. |
| 8,990,068 B2 | 3/2015 | Orsini |
| 8,996,352 B2 | 3/2015 | Orsini |
| 8,996,353 B2 | 3/2015 | Orsini |
| 8,996,355 B2 | 3/2015 | Orsini |
| 9,009,025 B1 | 4/2015 | Porter et al. |
| 9,031,829 B2 | 5/2015 | Leydon |
| 9,104,661 B1 | 8/2015 | Evans |
| 9,183,309 B2 | 11/2015 | Gupta |
| 9,231,898 B2 | 1/2016 | Orsini |
| 9,245,278 B2 | 1/2016 | Orsini |
| 9,336,206 B1 | 5/2016 | Orsini |
| 9,477,652 B2 | 10/2016 | Huang et al. |
| 9,734,142 B2 | 8/2017 | Huang et al. |
| 9,734,143 B2 | 8/2017 | Rottmann et al. |
| 9,740,687 B2 | 8/2017 | Herdagdelen et al. |
| 9,747,283 B2 | 8/2017 | Rottmann et al. |
| 9,805,029 B2 | 10/2017 | Rottmann et al. |
| 9,830,386 B2 | 11/2017 | Huang et al. |
| 9,830,404 B2 | 11/2017 | Huang et al. |
| 2002/0087301 A1 | 7/2002 | Jones et al. |
| 2002/0161579 A1 | 10/2002 | Saindon et al. |
| 2002/0169592 A1 | 11/2002 | Aityan |
| 2003/0040900 A1 | 2/2003 | D'Agostini et al. |
| 2004/0002848 A1 | 1/2004 | Zhou et al. |
| 2004/0049374 A1 | 3/2004 | Breslau et al. |
| 2004/0098247 A1 | 5/2004 | Moore |
| 2004/0122656 A1 | 6/2004 | Abir et al. |
| 2004/0243392 A1 | 12/2004 | Chino et al. |
| 2005/0021323 A1 | 1/2005 | Li et al. |
| 2005/0055630 A1 | 3/2005 | Scanlan et al. |
| 2005/0228640 A1 | 10/2005 | Aue et al. |
| 2006/0111891 A1 | 5/2006 | Menezes et al. |
| 2006/0206798 A1 | 9/2006 | Kohlmeier et al. |
| 2006/0271352 A1 | 11/2006 | Nikitin et al. |
| 2007/0130563 A1 | 6/2007 | Elgazzar et al. |
| 2007/0136222 A1 | 6/2007 | Horvitz et al. |
| 2008/0046231 A1 | 2/2008 | Laden et al. |
| 2008/0077384 A1 | 3/2008 | Agapi et al. |
| 2008/0281578 A1 | 11/2008 | Kumaran et al. |
| 2009/0070095 A1 | 3/2009 | Gao et al. |
| 2009/0083023 A1 | 3/2009 | Foster et al. |
| 2009/0132233 A1 | 5/2009 | Etzioni et al. |
| 2009/0182547 A1 | 7/2009 | Niu et al. |
| 2009/0198487 A1 | 8/2009 | Wong et al. |
| 2009/0210214 A1 | 8/2009 | Qian et al. |
| 2009/0276206 A1 | 11/2009 | Fitzpatrick et al. |
| 2009/0281789 A1 | 11/2009 | Waibel et al. |
| 2009/0326912 A1 | 12/2009 | Ueffing et al. |
| 2010/0042928 A1 | 2/2010 | Rinearson et al. |
| 2010/0121639 A1 | 5/2010 | Zweig et al. |
| 2010/0149803 A1 | 6/2010 | Nakano et al. |
| 2010/0161642 A1 | 6/2010 | Chen et al. |
| 2010/0194979 A1 | 8/2010 | Blumenschein et al. |
| 2010/0223048 A1 | 9/2010 | Lauder et al. |
| 2010/0228777 A1 | 9/2010 | Imig et al. |
| 2010/0241416 A1 | 9/2010 | Jiang et al. |
| 2010/0283829 A1 | 11/2010 | De Beer et al. |
| 2010/0299132 A1 | 11/2010 | Dolan et al. |
| 2011/0099000 A1 | 4/2011 | Rai et al. |
| 2011/0137636 A1 | 6/2011 | Srihari et al. |
| 2011/0246172 A1 | 10/2011 | Liberman et al. |
| 2011/0246881 A1 | 10/2011 | Kushman et al. |
| 2011/0252027 A1 | 10/2011 | Chen et al. |
| 2011/0282648 A1 | 11/2011 | Sarikaya et al. |
| 2012/0005224 A1 | 1/2012 | Ahrens et al. |
| 2012/0029910 A1 | 2/2012 | Medlock et al. |
| 2012/0035907 A1 | 2/2012 | Lebeau et al. |
| 2012/0035915 A1 | 2/2012 | Kitade et al. |
| 2012/0047172 A1 | 2/2012 | Ponte et al. |
| 2012/0059653 A1 | 3/2012 | Adams et al. |
| 2012/0101804 A1 | 4/2012 | Roth et al. |
| 2012/0109649 A1 | 5/2012 | Talwar et al. |
| 2012/0123765 A1 | 5/2012 | Estelle et al. |
| 2012/0130940 A1 | 5/2012 | Gattani et al. |
| 2012/0138211 A1 | 6/2012 | Barger et al. |
| 2012/0158621 A1 | 6/2012 | Bennett et al. |
| 2012/0173224 A1 | 7/2012 | Anisimovich et al. |
| 2012/0209588 A1 | 8/2012 | Wu et al. |
| 2012/0253785 A1 | 10/2012 | Hamid et al. |
| 2012/0330643 A1 | 12/2012 | Frei et al. |
| 2013/0018650 A1 | 1/2013 | Moore et al. |
| 2013/0060769 A1 | 3/2013 | Pereg et al. |
| 2013/0084976 A1 | 4/2013 | Kumaran et al. |
| 2013/0103384 A1 | 4/2013 | Hunter et al. |
| 2013/0144595 A1 | 6/2013 | Lord et al. |
| 2013/0144603 A1 | 6/2013 | Lord et al. |
| 2013/0144619 A1 | 6/2013 | Lord et al. |
| 2013/0173247 A1 | 7/2013 | Hodson et al. |
| 2013/0246063 A1 | 9/2013 | Teller et al. |
| 2013/0317808 A1 | 11/2013 | Kruel et al. |
| 2014/0006003 A1 | 1/2014 | Soricut et al. |
| 2014/0006929 A1 | 1/2014 | Swartz et al. |
| 2014/0012568 A1 | 1/2014 | Caskey et al. |
| 2014/0025734 A1 | 1/2014 | Griffin et al. |
| 2014/0059030 A1 | 2/2014 | Hakkani-Tur et al. |
| 2014/0081619 A1 | 3/2014 | Solntseva et al. |
| 2014/0108393 A1 | 4/2014 | Angwin et al. |
| 2014/0163977 A1 | 6/2014 | Hoffmeister et al. |
| 2014/0172413 A1 | 6/2014 | Cvijetic et al. |
| 2014/0195884 A1 | 7/2014 | Castelli et al. |
| 2014/0207439 A1 | 7/2014 | Venkatapathy et al. |
| 2014/0229155 A1 | 8/2014 | Leydon et al. |
| 2014/0279996 A1 | 9/2014 | Teevan et al. |
| 2014/0280295 A1 | 9/2014 | Kurochkin et al. |
| 2014/0280592 A1 | 9/2014 | Zafarani et al. |
| 2014/0288913 A1 | 9/2014 | Shen et al. |
| 2014/0288917 A1 | 9/2014 | Orsini et al. |
| 2014/0288918 A1 | 9/2014 | Orsini et al. |
| 2014/0303960 A1 | 10/2014 | Orsini et al. |
| 2014/0335483 A1 | 11/2014 | Buryak et al. |
| 2014/0337007 A1 | 11/2014 | Fuegen et al. |
| 2014/0337989 A1 | 11/2014 | Bojja et al. |
| 2014/0350916 A1 | 11/2014 | Jagpal et al. |
| 2014/0358519 A1 | 12/2014 | Dymetman et al. |
| 2014/0365200 A1 | 12/2014 | Sagie |
| 2014/0365460 A1 | 12/2014 | Portnoy et al. |
| 2015/0006143 A1 | 1/2015 | Skiba et al. |
| 2015/0006219 A1 | 1/2015 | Jose et al. |
| 2015/0033116 A1 | 1/2015 | Severdia et al. |
| 2015/0046146 A1 | 2/2015 | Crosley et al. |
| 2015/0066805 A1 | 3/2015 | Taira et al. |
| 2015/0120290 A1 | 4/2015 | Shagalov |
| 2015/0134322 A1 | 5/2015 | Cuthbert et al. |
| 2015/0142420 A1 | 5/2015 | Sarikaya et al. |
| 2015/0161104 A1 | 6/2015 | Buryak et al. |
| 2015/0161110 A1 | 6/2015 | Salz |
| 2015/0161112 A1 | 6/2015 | Galvez et al. |
| 2015/0161114 A1 | 6/2015 | Buryak et al. |
| 2015/0161115 A1 | 6/2015 | Denero et al. |

(56) References Cited

U.S. PATENT DOCUMENTS

| | | | |
|---|---|---|---|
| 2015/0161227 | A1 | 6/2015 | Buryak et al. |
| 2015/0213008 | A1 | 7/2015 | Orsini |
| 2015/0228279 | A1 | 8/2015 | Moreno et al. |
| 2015/0293997 | A1 | 10/2015 | Smith et al. |
| 2015/0363388 | A1 | 12/2015 | Herdagdelen et al. |
| 2016/0041986 | A1 | 2/2016 | Nguyen |
| 2016/0048505 | A1 | 2/2016 | Tian et al. |
| 2016/0092603 | A1 | 3/2016 | Rezaei et al. |
| 2016/0117628 | A1 | 4/2016 | Brophy et al. |
| 2016/0162473 | A1 | 6/2016 | Hedley et al. |
| 2016/0162477 | A1 | 6/2016 | Orsini |
| 2016/0162478 | A1 | 6/2016 | Blassin et al. |
| 2016/0162575 | A1 | 6/2016 | Eck |
| 2016/0177628 | A1 | 6/2016 | Juvani |
| 2016/0188575 | A1 | 6/2016 | Sawaf |
| 2016/0188576 | A1 | 6/2016 | Huang |
| 2016/0188661 | A1 | 6/2016 | Zhang et al. |
| 2016/0188703 | A1 | 6/2016 | Zhang et al. |
| 2016/0217124 | A1 | 7/2016 | Sarikaya et al. |
| 2016/0239476 | A1 | 8/2016 | Huang |
| 2016/0267073 | A1 | 9/2016 | Noeman et al. |
| 2016/0299884 | A1 | 10/2016 | Chioasca et al. |
| 2016/0357519 | A1 | 12/2016 | Vargas et al. |
| 2017/0011739 | A1 | 1/2017 | Huang et al. |
| 2017/0083504 | A1 | 3/2017 | Huang |
| 2017/0177564 | A1 | 6/2017 | Rottmann et al. |
| 2017/0185583 | A1 | 6/2017 | Pino et al. |
| 2017/0185586 | A1 | 6/2017 | Rottmann |
| 2017/0185588 | A1 | 6/2017 | Rottmann et al. |
| 2017/0270102 | A1 | 9/2017 | Herdagdelen et al. |
| 2017/0315988 | A1 | 11/2017 | Herdagdelen et al. |
| 2017/0315991 | A1 | 11/2017 | Rottmann et al. |

OTHER PUBLICATIONS

U.S. Appl. No. 14/302,032 of Herdagdelen, A et al., filed Jun. 11, 2014.
U.S. Appl. No. 14/559,540 of Eck, M et al., filed Dec. 3, 2014.
U.S. Appl. No. 14/586,022 of Huang, F. et al., filed Dec. 30, 2014.
U.S. Appl. No. 14/621,921 of Huang, F., filed Feb. 13, 2015.
U.S. Appl. No. 14/980,654 of Pino, J. et al., filed Dec. 28, 2015.
U.S. Appl. No. 15/275,235 of Huang, F. et al., filed Sep. 23, 2016.
Notice of Allowance dated Nov. 30, 2016, for U.S. Appl. No. 14/302,032 of Herdagdelen, A., filed Jun. 11, 2014.
Non-Final Office Action dated Dec. 21, 2016, for U.S. Appl. No. 14/586,022 of Huang, F. et al., filed Dec. 30, 2014.
Non-Final Office Action dated Jan. 12, 2017, for U.S. Appl. No. 15/275,235 of Huang, F. et al., filed Sep. 23, 2016.
Non-Final Office Action dated Jan. 19, 2017, for U.S. Appl. No. 14/980,654 of Pino, J. et al., filed Dec. 28, 2015.
Non-Final Office Action dated Feb. 9, 2017, for U.S. Appl. No. 14/559,540 of Eck, M. et al., filed Dec. 3, 2014.
Final Office Action dated Jun. 16, 2017, for U.S. Appl. No. 14/586,022 of Huang, F. et al., filed Dec. 30, 2014.
Notice of Allowance dated Jun. 6, 2017, for U.S. Appl. No. 14/981,794 by Rottmann, K., et al., filed Dec. 28, 2015.
Zamora, J.D., et al., "Tweets language identification using feature weightings," Proceedings of the Twitter language identification workshop, Sep. 16, 2014, 5 pages.
Extended European Search Report for European Application No. 16161095.1, dated Feb. 16, 2017, 4 pages.
U.S. Appl. No. 15/644,690 of Huang, F. et al., filed Jul. 7, 2017.
Notice of Allowance dated Jul. 12, 2017, for U.S. Appl. No. 14/981,794 by Rottmann, K., et al., filed Dec. 28, 2015.
Supplemental Notice of Allowability dated Jul. 13, 2017, for U.S. Appl. No. 14/981,769 by Rottmann, K., et al., filed Dec. 28, 2015.
Corrected Notice of Allowability dated Jul. 13, 2017, for U.S. Appl. No. 14/973,387 of Rottmann, K., et al., filed Dec. 17, 2015.
Final Office Action dated Jul. 1, 2016, for U.S. Appl. No. 14/302,032 of Herdagdelen, A., filed Jun. 11, 2014.
Non-Final Office Action dated Mar. 10, 2016, for U.S. Appl. No. 14/621,921 of Huang, F., filed Feb. 13, 2015.
Notice of Allowance dated Jul. 18, 2016, for U.S. Appl. No. 14/621,921 of Huang, F., filed Feb. 13, 2015.
U.S. Appl. No. 15/199,890 of Zhang, Y. et al., filed Jun. 30, 2016.
U.S. Appl. No. 15/244,179 of Zhang, Y. et al., filed Aug. 23, 2016.
Final Office Action dated Aug. 10, 2017 for U.S. Appl. No. 15/275,235 by Huang, F. et al., filed Sep. 23, 2016.
Final Office Action dated Aug. 25, 2017 for U.S. Appl. No. 14/980,654 by Pino, J. et al., filed Dec. 28, 2015.
Non-Final Office Action dated Aug. 25, 2017 for U.S. Appl. No. 15/652,175 by Herdagdelen, A., filed Jul. 17, 2017.
Notice of Allowance dated Aug. 30, 2017 for U.S. Appl. No. 14/559,540 by Eck, M. et al., filed Dec. 3, 2014.
Notice of Allowance dated Aug. 4, 2017, for U.S. Appl. No. 14/981,794 by Rottman, K., et al., filed Dec. 28, 2015.
Notice of Allowance dated Jul. 26, 2017, for U.S. Appl. No. 14/586,074 by Huang, F., et al., filed Dec. 30, 2014.
Notice of Allowance dated Jul. 28, 2017, for U.S. Appl. No. 14/586,049 by Huang, F., et al., filed Dec. 30, 2014.
U.S. Appl. No. 15/652,144 of Rottmann, K., filed Jul. 17, 2017.
U.S. Appl. No. 15/654,668 of Rottmann, K., filed Jul. 19, 2017.
U.S. Appl. No. 15/672,690 of Huang, F., filed Aug. 9, 2017.
U.S. Appl. No. 15/696,121 of Rottmann, K. et al., filed Sep. 5, 2017.
Corrected Notice of Allowability dated Nov. 17, 2017, for U.S. Appl. No. 14/559,540 of Eck, M. et al., filed Dec. 3, 2014.
Notice of Allowance dated Dec. 8, 2017 for U.S. Appl. No. 15/652,175 by Herdagdelen, A., filed Jul. 17, 2017.
Corrected Notice of Allowability dated Dec. 12, 2017, for U.S. Appl. No. 14/559,540 of Eck, M. et al., filed Dec. 3, 2014.
U.S. Appl. No. 15/820,351 by Huang et al., filed Nov. 21, 2017.
U.S. Appl. No. 15/821,167 by Huang et al., filed Nov. 22, 2017.
Final Office Action dated Sep. 8, 2017 for U.S. Appl. No. 15/445,978 of Herdagdelen, A. filed Feb. 28, 2017.
Notice of Allowability dated Sep. 12, 2017 for U.S. Appl. No. 14/981,794 by Rottman, K., et al., filed Dec. 28, 2015.
Notice of Allowability dated Sep. 19, 2017 for U.S. Appl. No. 14/559,540 by Eck, M. et al. filed Dec. 3, 2014.
Notice of Allowance dated Oct. 10, 2017 for U.S. Appl. No. 15/275,235 for Huang, F. et al., filed Sep. 23, 2016.
Notice of Allowance dated Oct. 23, 2017 for U.S. Appl. No. 15/445,978 of Herdagdelen, A. filed Feb. 28, 2017.
U.S. Appl. No. 15/723,095 of Tiwari, P. filed Oct. 2, 2017.
Taylor, S. et al. "Forecasting at Scale" Jan. 2017, retrieved from https://facebookincubator.github.io/prophet/static/prophet_paper_20170113.pdf.
International Search Report and Written Opinion for International Application No. PCT/US2015/051737, dated Jul. 28, 2016, 22 pages.
Koehn, P. et al., "Statistical Phrase-Based Translation," Proceedings of the 2003 Conference of the North American Chapter of the Association for computational Linguistics on Human Language Technology—vol. 1, Assoc. for Computational Linguistics, 2003, p.
Non-Final Office Action dated Dec. 29, 2016, for U.S. Appl. No. 14/586,049 of Huang, F. et al., filed Dec. 30, 2014.
Non-Final Office Action dated Dec. 30, 2016 in U.S. Appl. No. 14/586,074 by Huang, F. et al., filed Dec. 30, 2014.
Non-Final Office Action dated Jul. 28, 2016, for U.S. Appl. No. 14/861,747 of F. Huang, filed Sep. 22, 2015.
Non-Final Office Action dated Nov. 9, 2016, for U.S. Appl. No. 14/973,387 by Rottmann, K., et al., filed Dec. 17, 2015.
Non-Final Office Action dated Oct. 6, 2016, U.S. Appl. No. 14/981,794 of Rottmann, K., filed Dec. 28, 2015.
Notice of Allowance dated Apr. 13, 2017, for U.S. Appl. No. 14/973,387 of Rottmann, K., et al., filed Dec. 17, 2015.
Notice of Allowance dated Apr. 19, 2017, for U.S. Appl. No. 14/981,769 by Rottmann, K., et al., filed Dec. 28, 2015.
Notice of Allowance dated Apr. 20, 2017, for U.S. Appl. No. 14/302,032 by Herdagdelen, A., et al., filed Jun. 11, 2014.
Notice of Allowance dated Apr. 7, 2017 for U.S. Appl. 14/861,747 by Huang, F., et al., filed Sep. 22, 2015.
Notice of Allowance dated Mar. 1, 2017, for U.S. Appl. No. 14/981,769 by Rottmann, K., et al., filed Dec. 28, 2015.

(56) References Cited

OTHER PUBLICATIONS

Sutskever, I., et al., "Sequence to sequence learning with neural networks," Advances in Neural Information Processing Systems, pp. 3104-3112, 2014.
U.S. Appl. No. 14/586,049, by Huang et al., filed Dec. 30, 2014.
U.S. Appl. No. 14/586,074 by Huang et al., filed Dec. 30, 2014.
U.S. Appl. No. 14/861,747 by Huang, F., filed Sep. 22, 2015.
U.S. Appl. No. 14/973,387, of Rottmann, K., et al., filed Dec. 17, 2015.
U.S. Appl. No. 14/981,769 by Rottmann, K., et al., filed Dec. 28, 2015.
U.S. Appl. No. 14/981,794 by Rottmann, K., et al., filed Dec. 28, 2015.
U.S. Appl. No. 15/445,978 by Herdagdelen, A., et al., filed Feb. 28, 2017.
Vogel, S. et al., "HMM-Based Word Alignment in Statistical Translation." In Proceedings of the 16th Conference on Computational Linguistics—vol. 2, Association for Computational Linguistics, 1996, pp. 836-841.
Non-Final Office Action dated Jun. 26, 2017, for U.S. Appl. No. 15/445,978 of Herdagdelen, A., filed Feb. 28, 2017.

TRANSLATION CONFIDENCE SCORES

BACKGROUND

The Internet has provided a new way for people to connect and share information globally. Social media platforms, for example, enable people on opposite sides of the world to collaborate on ideas, discuss current events, or share what they had for lunch. In the past, this spectacular resource has been somewhat limited to communications between users having a common natural language ("language"). In addition, users have only been able to consume content that is in their language, or for which a content provider is able to provide an appropriate translation. While communication across different languages is a particular challenge, machine translation engines have been created to address this concern. These translation engines enable "content items," which can be any item containing language including text, images, audio, video, or other multi-media, to be quickly translated for consumption by users that are facile with a language different from a source language of the content item.

Machine translation engines enable a user to select or provide a source content item (e.g., a message from an acquaintance) in one natural language (e.g., Spanish) and quickly receive a translation of the content item in a different natural language (e.g., English). Parts of machine translation engines can be created using training data that includes identical or similar content in two or more languages. Where machine translations are implemented on a large scale, determining which translations are sufficiently accurate poses a problem. For example, the word "lift" can mean "move upward" among speakers of American English (as that word is commonly used in America), whereas it can mean "elevator" for British English speakers. A content item including the phrase, "press the button for the lift," could be translated into either "press the button for the elevator" or "press the button to go up." In addition, machine translations of a content item are often based on dictionary translations and do not consider context, which often makes a significant difference such as in idioms, slang, or colloquial passages.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
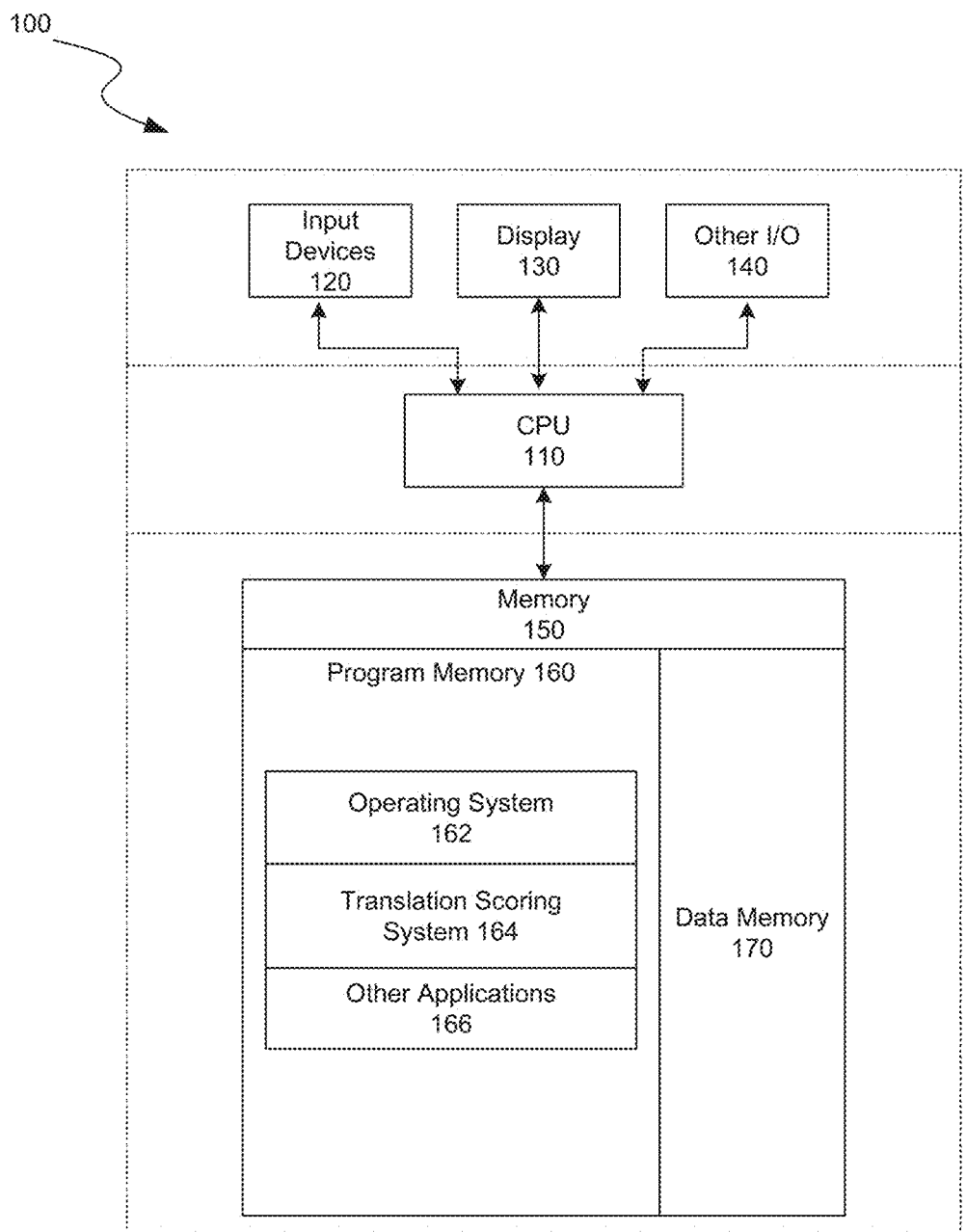
FIG. 1 is a block diagram illustrating an overview of devices on which some implementations can operate.

Embodiments for computing and using confidence scores of content item translations are described. A confidence scoring system can generate translation confidence scores using a trained translation confidence scoring model. The confidence scoring system can train translation confidence scoring models by obtaining translations that have been scored by at least one user. These translations and associated data, such as the source content item and characteristics of the translation engine that performed the translation, can be used as input to a confidence scoring model during a training phase. The confidence scoring system can adjust the confidence scoring model parameters based on a comparison of the confidence scoring model output with a combination of the user scores for that translation. After multiple iterations of this training procedure, the confidence scoring model will produce more accurate scores for translations.

Once the confidence scoring system has trained a confidence scoring model, the confidence scoring system can use the confidence scoring model to score translations that have not been previously scored by users. Scoring a translation can include extracting features from the translation and associated data in the same manner that was used in training the confidence scoring model. The translation and extracted features can then be provided to the confidence scoring model which can produce a confidence score. In some implementations, the confidence scoring system can compare this confidence score to a threshold to determine whether the translation should be upgraded using a better translation engine or a human translation. In some implementations, the confidence scoring system can compare this confidence score to another threshold to determine if translations of the source content item should be automatically performed.

A "model," as used herein, refers to a construct that is trained using training data to make predictions or provide probabilities for new data items, whether or not the new data items were included in the training data. For example, training data can include items with various parameters and an assigned classification. A new data item can have parameters that a model can use to assign a classification to the new data item. As another example, a model can be a probability distribution resulting from the analysis of training data, such as a the likelihood of an n-gram occurring in a given language based on an analysis of a large corpus from that language. Examples of models include: neural networks, support vector machines, decision trees, Parzen windows, Bayes, clustering, reinforcement learning, probability distributions, and others. Models can be configured for various situations, data types, sources, and output formats.

Performing machine translations can include sophisticated technical algorithms such as methods for determining and applying phrase correspondences between languages, methods for selecting training data and language corpus data, and methods for formatting data to be provided to models and adjusting models based on the results. Some machine translation engines can produce multiple translations for a single source phrase. In addition, different levels and methods of machine translations can be created and used, such as translators that use different amounts of processing power, use different language corpuses for probability distributions, etc. With the availability of multiple implementations of machine translations, confidence scores can be used to select which translations to use or to determine whether, after initial translations, additional possible translations should be computed. The disclosed confidence scoring system can improve machine translations by providing confidence scores that can help make determinations, such as when a translation is acceptably accurate to be automatically provided to users or when a translation is too unacceptably inaccurate and an alternate possible translation needs to be generated.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that can implement a translation confidence scoring system. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, translation scoring system 164, and other application programs 166. Memory 150 can also include data memory 170 that can include translations, details of translation models and associated training data, user scores of translations, details about users, confidence scores, translation upgrade score thresholds, auto-translation score thresholds, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
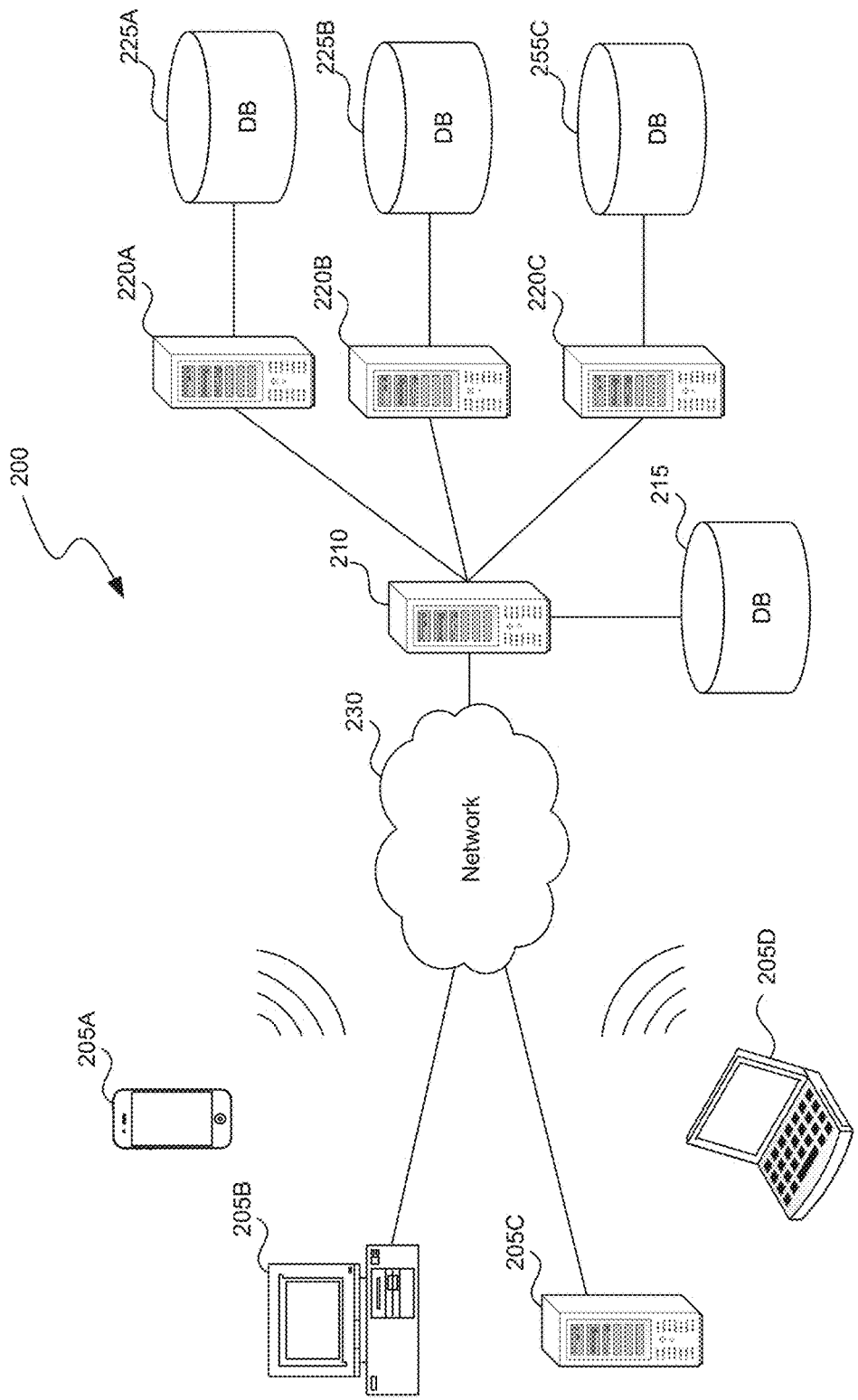
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
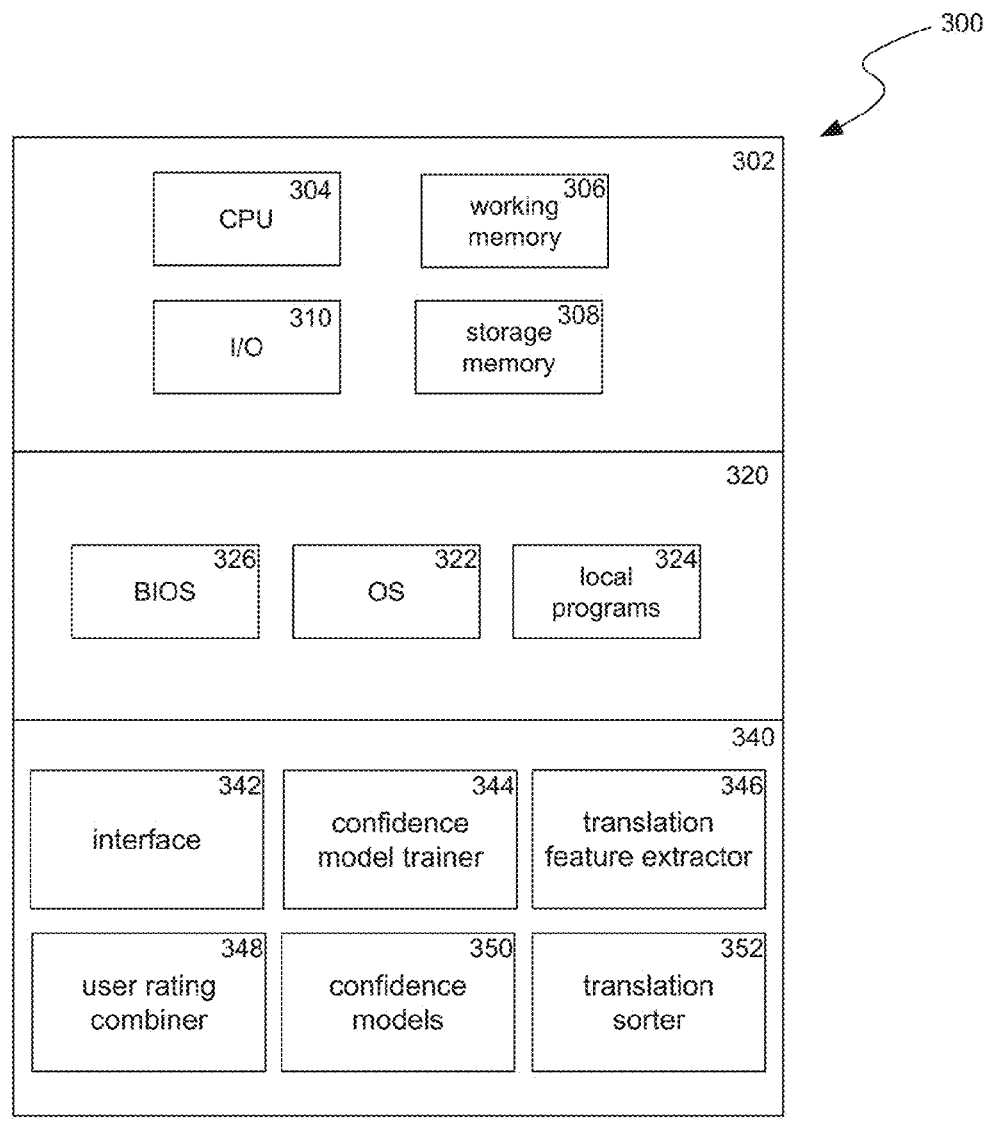
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include confidence model trainer 344, translation feature extractor 346, user rating combiner 348, confidence models 350, translation sorter 352, and components which can be used for transferring data and controlling the specialized components, such as interface 342. In some implementations, components 300 can be in a computing system that is distributed across multiple computing devices or can include an interface to a server-based application.

Confidence model trainer 344 can be configured to receive a model to train through interface 342. For example, the model can be a neural network that has not yet been trained such that weights for links between nodes or for node parameters are set to random or default values. Confidence model trainer 344 can also receive training items through interface 342. Training items can include translations that have been scored by one or more users. In some implementations, the training items can include indications of associated user scores. In some implementations, the confidence scoring system can select only training items that have received at least a threshold number of user scores or a threshold amount of scores based on weights assigned to user scores. In some implementations, training items can include additional data such as the source content item of the translation, information about the author of the source content item, or information about the translation system that created the translation, such as the training data that was used to create the translation engine that generated the translation in the training item.

Confidence model trainer 344 can, for each obtained training item, obtain features extracted from the training item such as length, number of rare or out-of-vocabulary words, etc. Confidence model trainer 344 can obtain features by employing translation feature extractor 346, described below. Confidence model trainer 344 can combine the extracted features into a form that can be provided to the received model, such as a sparse vector or an embedding where the extracted features are mapped into a vector space. The confidence scoring system can provide the extracted features and/or data of the training item to the received model to produce an output score. The confidence scoring system can then compare the output score to a combination of the user scores associated with the training item. The confidence model trainer 344 can obtain a combination of user scores by employing user rating combiner 348, discussed below. Based on the comparison, the confidence model trainer 344 can adjust the weighting factors or parameters of the received model, such that the output of the model more closely matches the user score combination. After multiple iterations of this training procedure, confidence model trainer 344 can produce a trained confidence model, and store it as a confidence model 350.

Translation feature extractor 346 can be configured to receive a training item, such as from confidence model trainer 344, and extract features from the training item that can be indicative of a quality of the translation in the training item. In various implementations, the features extracted from a training item can include one or more of: the length of the source item of the translation, the length of the translation, an amount of words in the source or translation that are rare (e.g. appear below a threshold number of times or frequency in a language corpus), an amount of words in the source or translation that are out of vocabulary (e.g. not in a language corpus or dictionary), a ratio of rare words and/or out of vocabulary words to the number of words in a training item, a complexity of phrases in the source or translation, a score measured by the IBM models indicating the semantic similarity between the source sentence and its translation, or probability scores of the source or the translation (e.g. a likelihood of phrases occurring in a language based on a language corpus).

User rating combiner 348 can be configured to receive multiple user scores for a translation and combine them. In some implementations, the combination can be computed by taking the average of the user ratings. In some implementations, the combination can be computed by taking a weighted average of user ratings. User ratings can be weighted based on an analysis of the user's facility with the output language of the translation. For example, users can be rated based on their ability to read, speak, or understand a given language, and this rating can be used to weight the rating that user provides for a translation. Assigning a classification to a user for language ability is described, for example, in U.S. patent application Ser. No. 14/302,032, titled CLASSIFYING LANGUAGES FOR OBJECTS AND ENTITIES, incorporated herein by reference. In some implementations, a score for a translation by a user that is fluent in the output language of the translation can be given greater weight than a score by a user that is less fluent in that output language. In some implementations, user ratings can be excluded from consideration where the ratings are more than a threshold amount different from a most common or average rating. For example, if one user provides a rating of 1/5 where the average rating is 3/5, this rating can be excluded from consideration.

Confidence models 350 can be trained by confidence model trainer 344 to generate a confidence score for a translation received through interface 342. Such a translation, with associated data, can be provided to translation feature extractor 346. The extracted features can be provided to one of the confidence models 350, along with a representation of the translation or source, and the model 350 can produce a confidence score indicating a quality level of the translation.

Translation sorter 352 can be configured to receive scores for one or more translations, which can be computed by one or more models of confidence models 350. Translation sorter 352 can select the translation that has the highest confidence score as the best translation of a content item. Translation sorter 352 can also classify a translation based on whether the computed confidence score for that translation is above one or more first thresholds or is below one or more other thresholds. One threshold can be an auto-translate threshold that is set such that, if the computed score is above the auto-translate threshold, the translation is automatically provided in situations where a user is determined to likely want a translation. For example, a system can have identified languages that a user is able to read, and when that user views a content item that is in a language other than one of these identified languages, the content item can have a translation that has a confidence score above the auto-translate threshold. In this case, the system can automatically provide the translation of the content item to the user in place of, or in addition to, the original content item. Another threshold can be a translation upgrade threshold that is set such that, if the computed score is below the translation upgrade threshold, the translation can be provided to another translation system or service, such as a more sophisticated machine translation engine or a human translator.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. For example, blocks shown in dashed lines may be excluded from some implementations. However, applicants do not intend to say that only blocks shown in dashed lines may be excluded from some implementations.

Figure 4:
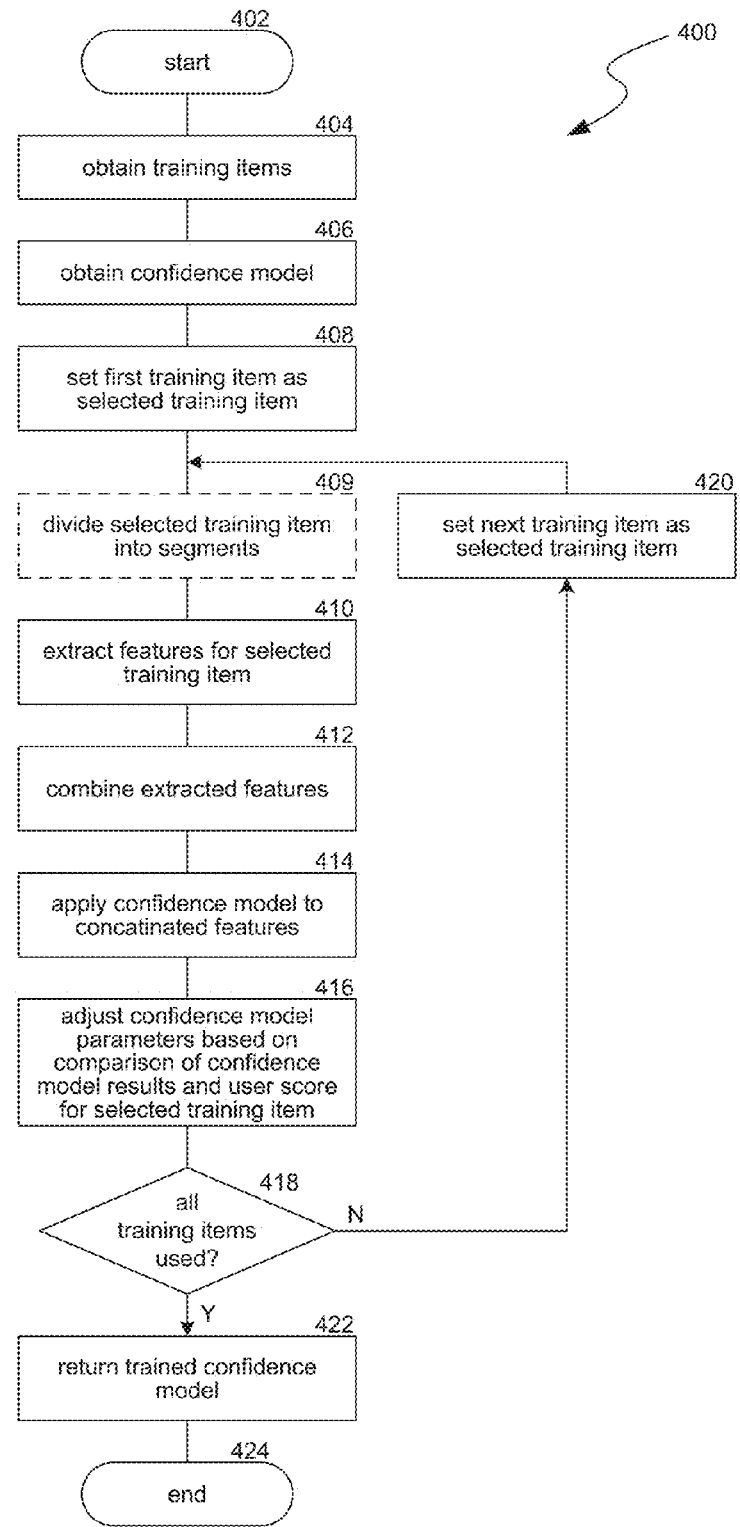
FIG. 4 is a flow diagram illustrating a process used in some implementations for training a translation scoring model.

FIG. 4 is a flow diagram illustrating a process 400 used in some implementations for training a translation scoring model. Process 400 begins at block 402 and continues to block 404. At block 404, process 400 can obtain multiple training items. In some implementations, a training item can include one or more of: a source content item, a translation of the content item, one or more user scores of the translation, an identification of the author of the source content item, or information about the system that created the translation, such as the training items or language corpus used to create that translation system. In some implementations, content items can be obtained from social network items, such as posts, news items, events, shares, comments, etc. In some implementations, the user scores of the translation can be obtained from a social media system where users are provided an interface to score translations. For example, in some social media websites, millions of users access a give translation and multiple of these users can provide a score. A selection of these scores, individually or as a combination (e.g. average, weighted average, etc.) can be used as the one or more user scores for a training item. In some implementations, the one or more user scores of the translation can be filtered so that only scores by users that have a fluency score above a fluency threshold are provided to process 400. For example, users of a social media website can be given fluency ratings based on factors such as self-identifications of fluency languages, which content items the user interacts with, how other users respond to content items created by that user in particular languages (e.g. number of "shares" or "likes" of the content items), etc. These fluency ratings can be used to filter user translation scores such that scores provided by users who are not sufficiently fluent in the output language of the translation (i.e. the language that the source content item is translated into) are not included.

At block 406, process 400 can obtain a confidence model to be trained to produce confidence scores. In some implementations, the confidence model can be a neural network with multiple input nodes that receive representations of the training items and extracted factors of the training items. The input nodes can include functions that receive the input and produce results. These results can be provided to one or more levels of intermediate nodes that each produce further results based on a combination of lower level node results. A weighting factor can be applied to the output of each node before the result is passed to the next layer node. At a final layer, i.e. the output layer, a node can produce a value that, once the model is trained, can be used as a confidence score for the input translation.

At block 408, process 400 can set a first one of the training items received at block 404 as a selected training item to be operated on by the loop between blocks 409-420. In some implementations, process 400 can divide the selected training item into segments or phrases at block 409, which can be handled individually so the model is trained to provide a confidence score for individual content item phrases or segments. At block 410, process 400 can extract features from the selected training item. In various implementations, the features extracted from a training item can include one or more of: the length of the source item of the translation, the length of the translated item, a number or frequency (i.e. an "amount") of words in the source or translation that are "rare" (e.g. appear below a threshold number of times or threshold frequency in a language corpus corresponding to the source or translation, respectively), an amount of words in the source or translation that are "out-of-vocabulary" (e.g. not in the language corpus or a dictionary), a complexity of phrases in the source or translation, a score measured by the IBM models indicating the semantic similarity between the source sentence and its translation, probability scores of the source or the translation (e.g. a likelihood of phrases occurring in a language based on a language corpus), or a similarity of the source to training data that was used to train a translation engine that created the translation. In some implementations where the loop between blocks 409 and 420 is performed to train a model that computes confidence scores for content item segments, the extracted features can be for each content item segment.

At block 412, process 400 can combine the features extracted at block 410 into a form suitable to be provided to the model obtained at block 406. In some implementations, at block 412, process 400 can add values for the features extracted at block 410 to a sparse vector or matrix to provide as part of the input to the confidence model. In some implementations, the features can be used to select a lower dimension vector, referred to herein as an "embedding," in a vector space that has fewer dimensions than the number of features, where the embedding can be used as part of the input to the confidence model.

At block 414, process 400 can apply the confidence scoring model to the combined features from block 412. As discussed above, where the model is a neural network, this can include providing a representation of the extracted features to a function corresponding to each input node of the model to produce a first level of results. The results from each input node can be provided to each node at a next level where the result provided from a lower layer node to a next layer node can be weighted based on a weighting value assigned to the connection between those two nodes. This process of nodes at a given layer producing results and passing the results to nodes at a next layer can continue until the results are passed to a final node at an output layer, which can produce a confidence score for the selected training item or for a segment of the selected training item. Where process 400 is performed to compute individual scores for segments of a content item, a score for the entire translation corresponding to the selected training item can be computed by combining the scores for the individual segments. For example, the scores can be combined by taking their average or weighted average using segment length as a weighting parameter. Computing a combined score can be needed to train the confidence scoring model because user scores that are being used as a baseline for training may be for entire translations, not segments.

At block 416, process 400 can compare the score computed at block 414 with a user score for the translation corresponding to the selected training item. The user score can be a combination of user ratings or scores provided for the translation. For example, when translations of content items are provided to users in a social media website, the users can also be provided with an interface to provide a score indicating the user's opinion on the quality of the translation, such as in a 1-5 star rating. In some implementations, individual user scores can be weighted based on a user fluency rating, in the output language of the translation, of the user who provided the translation score. For example, users of a social media website can be given fluency ratings based on factors such as self-identifications of languages he is fluent in, which content items the user interacts with, how other users respond to content items created by that user in particular languages (e.g. number of "shares" or "likes"), etc. These fluency ratings can be used to weight user translation scores such that scores provided by users who are more fluent in the output language of the translation (i.e. the language that the source content item is translated into) are given greater weight.

Based on results of the comparison of the score produced at block 414 with the combination of user ratings, process 400 can adjust the confidence model received at block 406. For example, where the model is a neural network, adjusting the model can comprise modifying one or more of the weights applied between nodes in the neural network or modifying parameters of one or more of the functions associated with neural network nodes. These modifications can change the output of the confidence model such that the result provided by the output node more closely matches the combination of user ratings. These modifications, after multiple iterations, e.g. using the loop between blocks 409-420, can result in the confidence scoring model being able to accurately produce confidence scores for translations.

At block 418, process 400 can determine whether all the training items received at block 404 have been operated on by the loop between blocks 409 to 420. If so, process 400 can continue to block 422; if not, process 400 can continue to block 420. At block 420, process 400 can set the next training item, of the training items received at block 404, as the selected training item to be operated on by the loop between blocks 409-420. At block 422, process 400 can return the confidence scoring model that has now been trained with the training items. Process 400 can then continue to block 424, where it ends.

Figure 5:
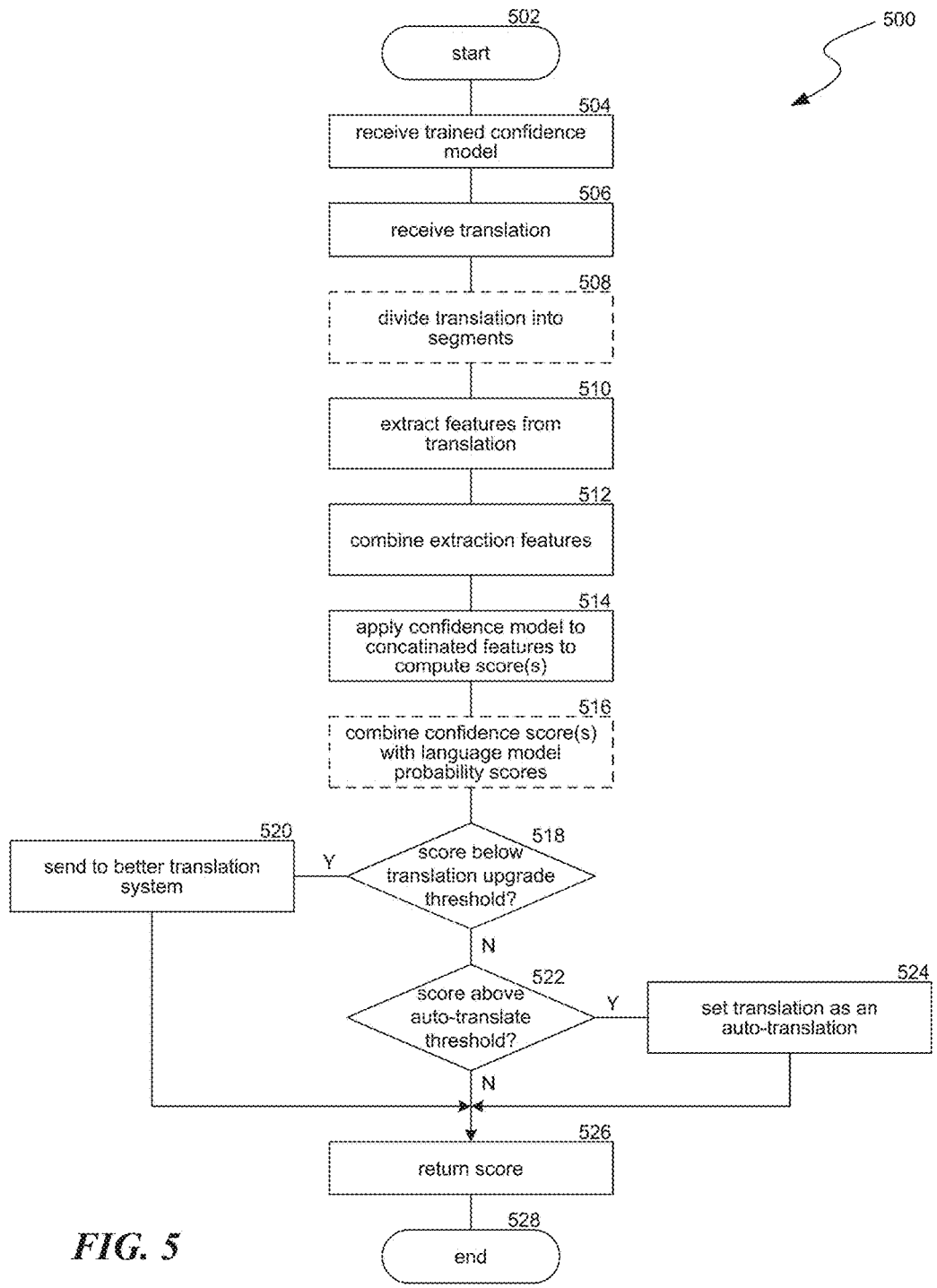
FIG. 5 is a flow diagram illustrating a process used in some implementations for applying a translation scoring model.

FIG. 5 is a flow diagram illustrating a process 500 used in some implementations for applying a translation scoring model. Process 500 begins at block 502 and continues to block 504. At block 504, process 500 can receive a trained confidence scoring model, such as a model trained using process 400.

At block 506, process 500 can receive a translation to score. In some implementations, a translation can be accompanied by associated data such as one or more of: the source content item that was translated, information about an author of the source content item, or information about the system that was used to create the translation. In some implementations, process 500 can be used to compute a confidence score for individual segments of a translation. In these implementations, at block 508, process 500 can divide the translations into the segments to be scored. In some implementations, dividing the translation into segments can be based on length, such as by dividing the translation into phrases of a certain number of words. In some implementations, the dividing can be based on phrase type, such as by making a segment from the noun phrase, a segment from the verb phrase, etc. In some implementations, the segments resulting from the dividing can overlap, such as where all possible n-grams of at least a particular length are selected as segments.

At block 510, process 500 can extract features from the translation received at block 506. The extracted features can correspond to features that were extracted during training of the model that is received at block 504. In some implementations where the confidence scoring model received at block 504 is a model trained using process 400, the translation received at block 506 can be associated with data corresponding to the data used by block 410 to extract features of the translation. Similarly, the features extracted at block 510 can be the same type of features as those extracted at block 410; e.g. one or more of: the length of the source item of the translation, the length of the translated item, a number or frequency (i.e. an "amount") of words in the source or translation that are "rare" (e.g. appear below a threshold number of times or threshold frequency in a language corpus corresponding to the source or translation, respectively), an amount of words in the source or translation that are "out-of-vocabulary" (e.g. not in the language corpus or a dictionary), a complexity of phrases in the source or translation, a score measured by the IBM models indicating the semantic similarity between the source sentence and its translation, probability scores of the source or the translation (e.g. a likelihood of phrases occurring in a language based on a language corpus), or a similarity of the source to training data that was used to train a translation engine that created the translation. In some implementations where the loop between blocks 409 and 420 is performed to train a model that computes confidence scores for content item segments, the extracted features can be for each content item segment.

At block 512, process 500 can combine the features extracted at block 510 into a format suitable to be provided to the confidence scoring a model. In some implementations, combining the extracted features comprises entering values corresponding to the features into a matrix or sparse vector, creating an embedding, or otherwise concatenating values corresponding the extracted features. In implementations where the confidence scoring model received at block 504 was trained using process 400, the combination of extracted features can be performed in the same manner as the combination of extracted features performed at block 412.

At block 514, process 500 can apply the confidence scoring model to the translation by providing the combination of extracted features to the confidence scoring model. The confidence scoring model can then produce a confidence score for the translation. In some implementations, the input to the confidence scoring model can also include a representation of the translation or a representation of the source of the translation.

In some implementations, a confidence score for a translation can be based on additional factors in addition to the output from the confidence scoring model. For example, at block 516, a language model can provide a likelihood score for a given translation. The likelihood score can indicate, based on a previously examined language corpus, how likely individual phrases in the translation are to occur in the output language. This likelihood score can be used to adjust the score from the confidence scoring model. For example, a translation with multiple phrases that are extremely unlikely to occur in a given language is unlikely to be a good translation, thus the confidence score for that translation can be reduced.

In implementations where process 500 is computing a score for individual segments of the received translation, the features can be extracted (block 510), combined (block 512), and supplied to the confidence scoring model (block 514) for each individual segment. The scores for the segments of the translation can be adjusted based on language model probability scores (block 516). In some implementations, process 500 can be performed to score segments of different translations of the same source content item. Based on the scores of individual phrases, portions of different translations can be selected as the final translation of the source content item. For example, a source content item could include the phrase "I'm fed up with beating around the bush." A first translation could have a meaning of "I'm not happy about hitting the foliage" and a second translation could have a meaning of "I've eaten enough and I am tired of the delays." In this example, confidence scores on a 1-100 scale can be computed for each of the phrases as follows: "I'm not happy"-75, "hitting the foliage"-37, "I've eaten enough"-20 and "I am tired of the delays"-82. The system can then select a combination of the higher scoring phrases: "I'm not happy and I am tired of the delays," as the best translation. An overall score can be attributed to this translation based on a combination of the scores. For example, using an average: (75+82)/2=78.5; or weighted according to the length of the phrases: (75*3+82*6)/9=79.67.

In some implementations, process 500 is employed just to compute a confidence score for a translation, in which case after block 514 or 516 process 500 can continue to block 526. In some implementations, process 500 is employed to use the computed confidence score to classify the translation or to use the translation in one or more actions. At block 518, process 500 can determine whether the confidence score computed at block 514 or 516 is below a translation upgrade threshold. In some implementations, this translation upgrade threshold can be a score of 3.5 or less out of five. In some implementations, this translation upgrade threshold can be computed based on a comparison of translation precision scores to number of acceptable translations at a given score. This comparison is discussed in greater detail below in relation to FIG. 6. If the score is above the translation upgrade threshold process 500 can continue to block 522; and if the score is at or below the translation upgrade threshold, process 500 can continue to block 520. At block 520, process 500 can upgrade the translation of the content item. In various implementations, upgrading the translation of the content item can include using a more sophisticated machine translation engine or providing the content item to a human to manually translate the content item.

At block 522, process 500 can determine whether the confidence score computed at block 514 or 516 is above an auto-translate threshold. In some implementations, this auto-translate threshold can be a score of 3.8 or more out of five. In some implementations, this auto-translate threshold can be computed based on a comparison of translation precision scores to number of acceptable translations at a given score. This comparison is discussed in greater detail below in relation to FIG. 6. If the score is below the auto-translate threshold, process 500 can continue to block 526; and if the score is at or above the auto-translate threshold, process 500 can continue to block 524. At block 524, process 500 can classify the translation received at block 506 as a translation that should be automatically provided in certain circumstances. For example, the translated content item can be automatically provided when the content item that was translated into the received translation appears on a page of a social media website for a user that is identified as not being able to read the language of the content item but is able to read that language of the translated content item. As another example the translated content item can be automatically provided when the content item that was translated into the received translation appears on a page of a social media website for a user that typically requests content items to be translated from the language of the content item to the language of the translated content item.

Process 500 can then continue to block 526, where it can return the score computed at block 514 or 516, an indication of one of the actions taken or classifications made, or an indication of a best translation determined from a combination of segments. Process 500 can then continue to block 528, where it ends.

Figure 6:
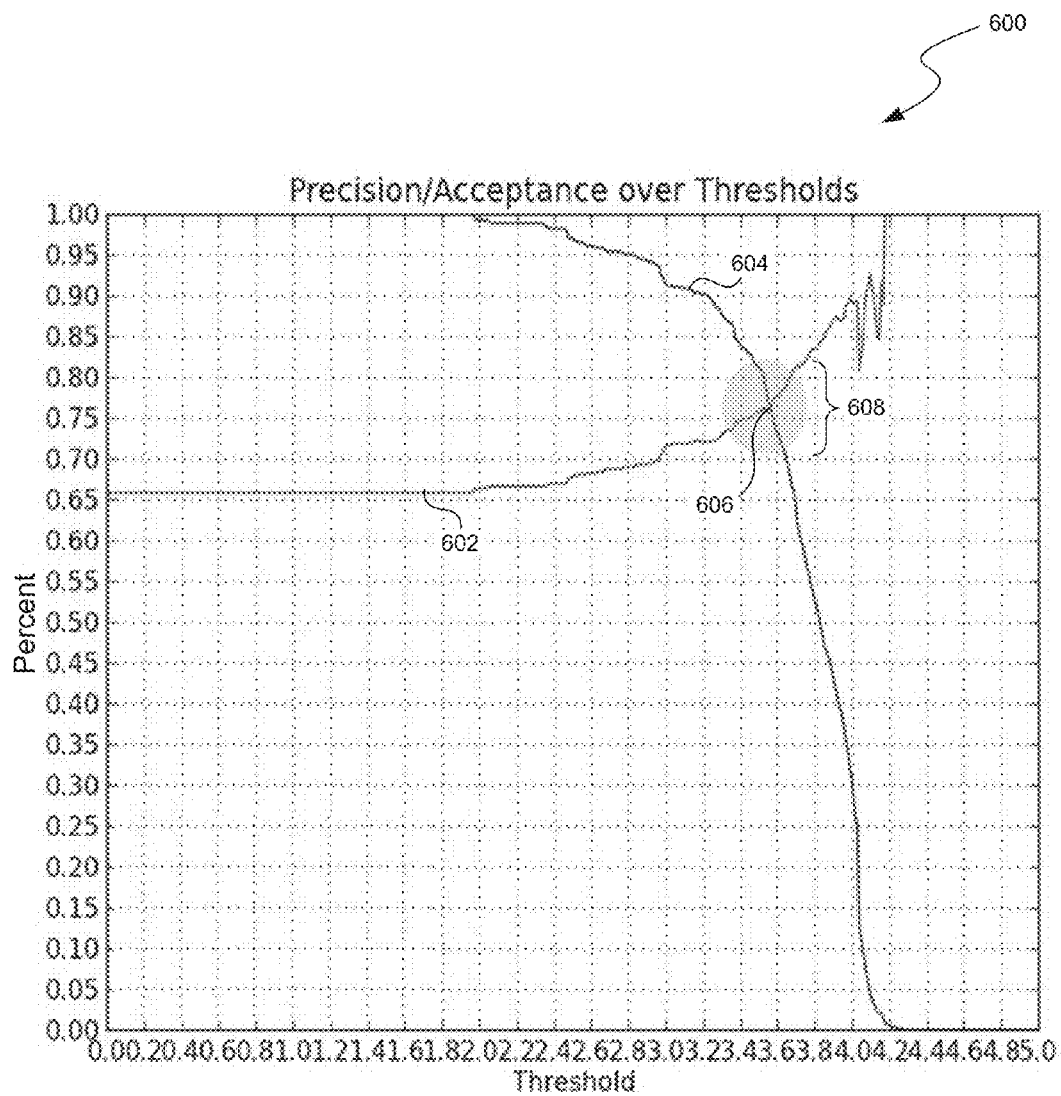
FIG. 6 is a graph illustrating a data comparison used in some implementations for selecting translations to upgrade or for selecting translations to use as auto-translations.

FIG. 6 is a graph 600 illustrating a data comparison used in some implementations for selecting translations to upgrade or for selecting translations to use as auto-translations. For example, the data depicted in graph 600 can be used for selecting an auto-translate threshold or a translation upgrade threshold.

Graph 600 is based on data gathered from a social media website. Line 602 in graph 600 shows a measure of precision (as a percentage) of translations with given threshold values. Line 604 in graph 600 shows a percentage of translations that are considered usable with given threshold values. The intersection of these lines, at 606, shows a location where precision is acceptably high while an acceptable amount of translations are considered usable. Using the data in graph 600, this location is at a threshold of approximately 3.65. The shaded area 608 shows an area of ±1.5, i.e. 3.5 and 3.8, to set as a translation upgrade threshold and an auto-translate threshold, respectively.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for training and applying a confidence scoring model, comprising:
receiving multiple training items, wherein a training item comprises: a source content item, a translation of the source content item, and one or more user scores for the translation of the source content item;
training a confidence scoring model by, for a selected training item of the multiple training items:
extracting features of the selected training item;
combining the extracted features of the selected training item into an input for the confidence scoring model to produce an intermediate confidence score, wherein the intermediate confidence score is computed based on parameters or weights of the confidence scoring model;
comparing the intermediate confidence score to the one or more user scores for the translation of the source content item of the selected training item; and
based on the comparison of the intermediate confidence score to the one or more user scores, modifying one or more of the parameters or weights of the confidence scoring model, wherein the modification of the parameters or weights of the confidence scoring model adjusts the confidence scoring model in favor of the one or more user scores;
computing a confidence score for a given translation generated by a first machine translation system applying first translation logic using the trained confidence scoring model;
determining that the confidence score is below a threshold; and
in response to determining that the confidence score is below the threshold:
submitting request for an updated version of the translation, the request comprising one or more of a request for a translation by a second machine translation system different from the first translation system, a request for a translation by second translation logic different from the first translation logic, or a request for a translation by a translator user;
receiving the updated version of the translation in response to the request; and
providing the updated version of the translation to a receiving user.

2. The method of claim 1 wherein extracting features of the selected training item comprises computing one or more of:
a length of the source content item;
a length of the translation;
an amount of words in the source content item that appear below a threshold amount in a language corpus corresponding to the source content item;
an amount of words in the translation that appear below a threshold amount in a language corpus corresponding to the translation; or
any combination thereof.

3. The method of claim 1 wherein extracting features of the selected training item comprises:
an amount of words in the source content item that are not in a language corpus corresponding to the source content item or a dictionary corresponding to the source content item;
an amount of words in the translation that are not in a language corpus corresponding to the translation or a dictionary corresponding to the translation;
a complexity measure of phrases in the source content item;
a complexity measure of phrases in the translation; or
any combination thereof.

4. The method of claim 1 wherein extracting features of the selected training item comprises:
a likelihood of phrases from the source content item occurring based on a language corpus corresponding to the source content item;
a likelihood of phrases from the translation occurring based on a language corpus corresponding to the translation;
a similarity measure of phrases in the source content item to training data used to train a machine translation engine that created the translation; or
any combination thereof.

5. The method of claim 1 wherein the multiple training items each further comprise one or more of:
an identification of an author of the source content item;
information identifying training items or a training language corpus used to create a machine translation system that created the translation of the source content item; or
any combination thereof.

6. The method of claim 1 wherein comparing the intermediate confidence score to the one or more user scores comprises:
obtaining user fluency scores for at least some of the users who provided the one or more user scores for the translation, each fluency score providing a rating for a language that translation is in for one of the users who provided the one or more user scores; and
weighting the one or more user scores based on the fluency scores such that user scores provided by users with higher fluency scores are given greater weight than user scores provided by users with comparatively lower fluency scores.

7. The method of claim 1 wherein the confidence scoring model is a neural network.

8. The method of claim 1 wherein combining the extracted features of the selected training item into the input for the confidence scoring model comprises one or more of:
setting values corresponding to the extracted features in a sparse vector; or generating an embedding of the extracted features in a vector space with fewer dimensions than the number of extracted features.

9. The method of claim 1 wherein the one or more user scores were previously received through a translation scoring interface of a social media website.

10. A non-transitory computer-readable storage medium storing instructions that, when executed by a computing system, cause the computing system to perform operations for applying a confidence scoring model, the operations comprising:
receiving a translation of a source content item;
extracting features of the translation;
combining the extracted features of the translation into an input for the confidence scoring model;
applying the confidence scoring model to the input for the confidence scoring model to produce a confidence score, wherein the confidence score is computed based on parameters or weights of the confidence scoring model;
determining that the confidence score is above an auto-translate threshold; and
in response to determining that the confidence score is above the auto-translate threshold, causing the translation to be automatically displayed in a user interface of a user of a social media website.

11. The computer-readable storage medium of claim 10, wherein the operations further comprise dividing the translation into multiple segments;
wherein extracting features of the translation comprises extracting a set of features for each of the multiple segments;
wherein combining the extracted features of the translation into an input for the confidence scoring model comprises combining each set of extracted features into a segment input for the confidence scoring model; and
wherein applying the confidence scoring model to the input comprises applying the confidence scoring model for each of the segment inputs.

12. The computer-readable storage medium of claim 11, wherein the operations further comprise using results of applying the confidence scoring model for each of the segment inputs to select a subset of the multiple segments to combine with segments of other translations of the source content item as a preferred translation of the source content item.

13. The computer-readable storage medium of claim 10 wherein the defined circumstances include a circumstance where the source content item appears on a page of the social media website for a user that is identified as not being able to read a language of the source content item but able to read the language of the translation.

14. The computer-readable storage medium of claim 10 wherein the defined circumstances include a circumstance where the source content item appears on a page of the social media website for a user that is identified as typically requesting content items to be translated from a language of the source content item to a language of the translation.

15. The computer-readable storage medium of claim 10 wherein the auto-translate threshold is computed based on a comparison of translation precision scores with an amount of acceptable translations at a given confidence score.

16. A system for training and applying a confidence scoring model, comprising:
a memory;
one or more processors;
an interface configured to receive multiple training items, wherein a training item comprises: a translation of a source content item and one or more user scores for the translation;
a confidence model trainer configured to train a confidence scoring model by, for a selected training item of the multiple training items:
using a translation feature extractor to extract features of the selected training item;
combining the extracted features of the selected training item into an input for the confidence scoring model to produce an intermediate confidence score, wherein the intermediate confidence score is computed based on parameters or weights of the confidence scoring model;
comparing the intermediate confidence score to the one or more user scores for the translation of the selected training item; and
based on the comparison of the intermediate confidence score to the one or more user scores, modifying one or more of the parameters or weights of the confidence scoring model, wherein the modification of the parameters or weights of the confidence scoring model adjusts the confidence scoring model using the input in favor of the one or more user scores;
one or more confidence models comprising at least the trained confidence scoring model; and
a translation sorter configured to:
receive, from the one or more confidence models, multiple scores each corresponding to one of multiple translations of a content item; and
select, from the multiple translations, the translation with the highest corresponding score to use as a translation of the content item.

17. The system of claim 16 wherein extracting features of the selected training item comprises computing one or more of:
a length of the source content item;
a length of the translation;
an amount of words in the source content item that appear below a threshold amount in a language corpus corresponding to the source content item;
an amount of words in the translation that appear below a threshold amount in a language corpus corresponding to the translation;
an amount of words in the source content item that are not in the language corpus corresponding to the source content item or a dictionary corresponding to the source content item;
an amount of words in the translation that are not in the language corpus corresponding to the translation or a dictionary corresponding to the translation;
a complexity of phrases in the source content item;
a complexity of phrases in the translation;
a likelihood of phrases from the source content item occurring based on a language corpus corresponding to the source content item;
a likelihood of phrases from the translation occurring based on a language corpus corresponding to the translation;
a similarity measure of phrases in the source content item to training data used to train a machine translation engine that created the translation; or
any combination thereof.

18. The system of claim 16 wherein the confidence model trainer is configured to compare the intermediate confidence score to the one or more user scores by:

obtaining user fluency scores for the users who provided the one or more user scores for the translation, each fluency score providing a language rating, corresponding to the language of the translation, for one of the users; and weighting the one or more user scores based on the fluency scores such that user scores provided by users with higher fluency scores are given greater weight than user scores provided by users with comparatively lower fluency scores.

19. The system of claim 16 wherein the confidence model trainer is configured to combine the extracted features of the selected training item into the input for the confidence scoring model by setting values corresponding to the extracted features in a sparse vector.

20. The system of claim 16 wherein the one or more user scores are received through a translation scoring interface of a social media website.

* * * * *